United States Patent [19]
Koo

[11] Patent Number: 5,280,392
[45] Date of Patent: Jan. 18, 1994

[54] AUTOMATIC COPY SYSTEM OF A DOUBLE-DECK VCR AND CONTROL METHOD THEREOF

[75] Inventor: Min H. Koo, Suweon, Rep. of Korea

[73] Assignee: SamSung Electronics, Co. Ltd., Suwon, Rep. of Korea

[21] Appl. No.: 767,850

[22] Filed: Sep. 30, 1991

[30] Foreign Application Priority Data

Dec. 31, 1990 [KR] Rep. of Korea .................... 90-23086

[51] Int. Cl.$^5$ ............................................. G11B 5/86
[52] U.S. Cl. ..................................................... 360/15
[58] Field of Search ...................... 360/15, 13; 369/84, 369/83, 85

[56] References Cited

U.S. PATENT DOCUMENTS

| | | | |
|---|---|---|---|
| 4,577,239 | 3/1986 | Sougen | 360/33.1 |
| 4,630,133 | 12/1986 | Long | 360/15 |
| 4,768,110 | 8/1988 | Dunlap et al. | 360/15 |
| 5,057,934 | 10/1991 | Yun et al. | 360/15 |
| 5,177,618 | 1/1993 | Dunlap et al. | 360/15 |

FOREIGN PATENT DOCUMENTS 2252662 8/1992 United Kingdom .................. 360/15

OTHER PUBLICATIONS

Sharp, Owner's Manual, VCR, Model VC-5W20E, May 25, 1988.

Primary Examiner—Robert J. Pascal
Assistant Examiner—Tan Dinh
Attorney, Agent, or Firm—Robert E. Bushnell

[57] ABSTRACT

An apparatus and method for automatically selecting and recording in the double-deck VCR one of may programs on a tape of a first deck to a tape of a second deck. The apparatus and method include displaying upon activation of a mark service key by a user, a message instructing the user to select a desired program to be recorded by using number keys, detecting a mark signal at a starting point of a program recorded in the tape of the first deck by fast forward operation of the tape of the first deck, determining whether a mark signal counter value equals a program number, and performing playback mode in the first deck and copy mode in the second deck to automatically copy the selected program in the tape of the first deck to the tape of the second deck.

11 Claims, 3 Drawing Sheets

AUTOMATIC COPY SYSTEM OF A DOUBLE-DECK VCR AND CONTROL METHOD THEREOF

BACKGROUND OF THE INVENTION

The present invention relates to a double-deck VCR(Video Cassette Recorder) which has double decks in a same body to record and copy the video signal, and more particularly to, an automatic copy apparatus of the double-deck VCR which selects a program recorded in a tape of a first deck and copies the selected program to another tape of a second deck, and a control method thereof.

In conventional VCRs, if many programs have been commonly recorded on one tape, a mark signal VISS has been recorded at each recording start position of each program.

Thus, if the mark signals recorded at the recording start positions are detected during rewind operation or fast search operation, the content of the programs is played back for a predetermined time (about 5 seconds) so that the content of the recorded program could be recognized.

Recently, double-deck VCRs having two decks in one set have been developed. However, when an user wants to copy only desired programs among many programs recorded in the tape of the first deck to the tape of the second deck, the operation is complicated. In order to copy a first program from the tape of the first deck to that of the second deck, the first program must be found among many programs recorded on the tape by using the mark signals, where the first deck performs the playback mode and the second deck performs the record mode. Next, the first deck performs the fast forward operation to find the mark signal of a second program to be copied.

Therefore, if the mark signal of the second program is detected, the first deck performs the playback mode and the second deck performs the record mode, so as to copy the second program on the tape of the first deck to the tape of the second deck. By repeating the above described operations, the target programs on the tape of the first deck are copied to the tape of the second deck. Thus, when the user wants only the desired programs among many programs recorded in the tape of the first deck to be copied to the tape of the second deck of the double-deck VCR, the process is complicated.

SUMMARY OF THE INVENTION

The present invention overcomes the above mentioned problems and provides an automatic copy method for a double-deck VCR, in which desired programs of a tape of the first deck are automatically copied to a tape of the second deck by detecting the position of the desired programs on the tape of the first deck according to selected numbers for the programs.

According to one aspect of the present invention, there is an automatic copy apparatus of a double-deck VCR which can perform both the record and the playback modes, the apparatus comprising a first deck and a second deck, a keyboard having a mark service key for providing a message instructing a user to select a desired program from recorded programs on a tape of the first deck and a plurality of number keys on the keyboard for selecting the desired program, a microprocessor for controlling the apparatus according to external signals, a character generator for generating the message in characters, a display for displaying the message generated by the character generator, and a circuit controller for driving circuits according to control signals of the microprocessor.

According to another aspect of the present invention, there is also provided a method of controlling an automatic copy apparatus of a double-deck VCR, the method comprising the steps of displaying a message instructing the user to select desired programs on a screen of a character generator in dependence upon a mark signal found when a mark service key is entered by a user on a keyboard, assigning numbers of the desired programs by using number keys on the keyboard, detecting the mark signal at a starting position of a program recorded in a tape of a first deck by fast forward operation of the tape of the first deck, distinguishing whether counted mark signals equal input numbers, and performing playback mode in the first deck and copy mode on a tape in a second deck to automatically copy the selected programs from the tape of the first deck to the tape of the second deck.

DETAILED DESCRIPTION OF PREFERRED EMBODIMENT OF THE INVENTION

Figure 1:
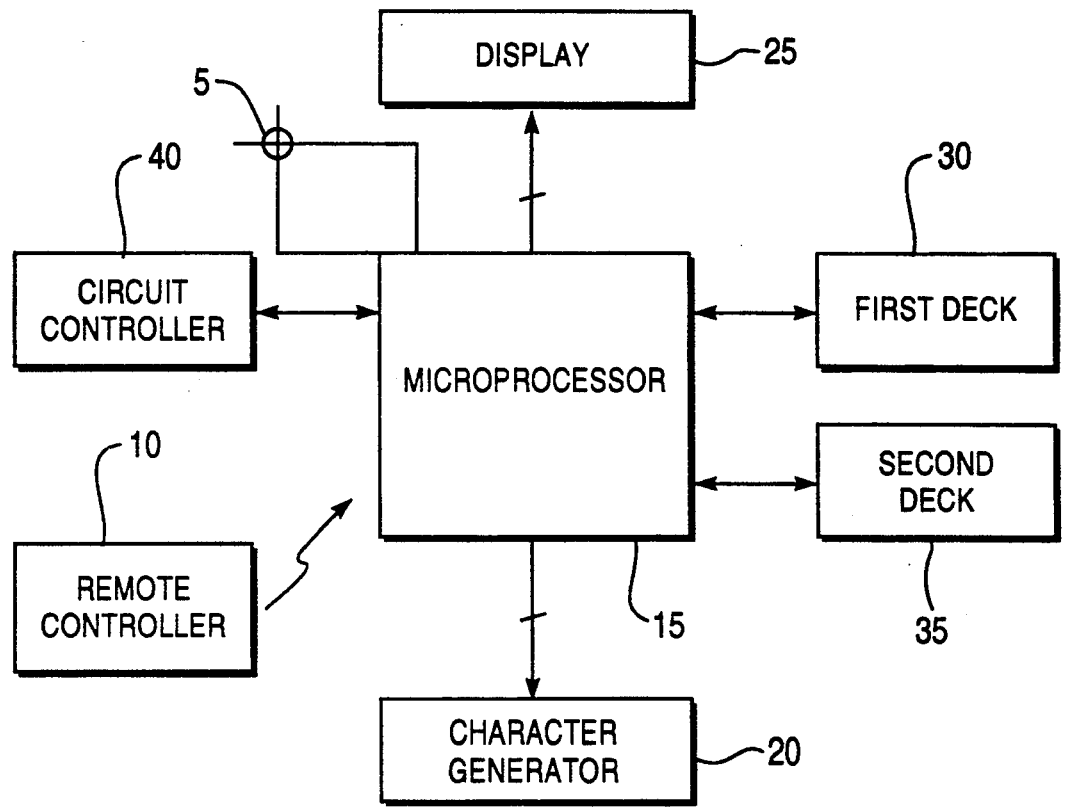
FIG. 1 is a block diagram of the automatic copy apparatus of a double-deck VCR according to the present invention.

FIG. 1 is a block diagram of the automatic copy apparatus of a double-deck VCR according to the present invention, in which the apparatus comprises a keyboard 5 having a mark service key and a plurality of number keys, a remote controller 10, and a microprocessor 15 for controlling the system.

The microprocessor 15 displays a current state of the VCR on a display 25 according to an input signal from the keyboard 5 or the remote controller 10, and drives a first deck 30, a second deck 35 and a circuit control part 40. The control signals provided from the microprocessor 15 are converted to characters by a character generator 20 and subsequently displayed on the display 25.

Figure 2A:
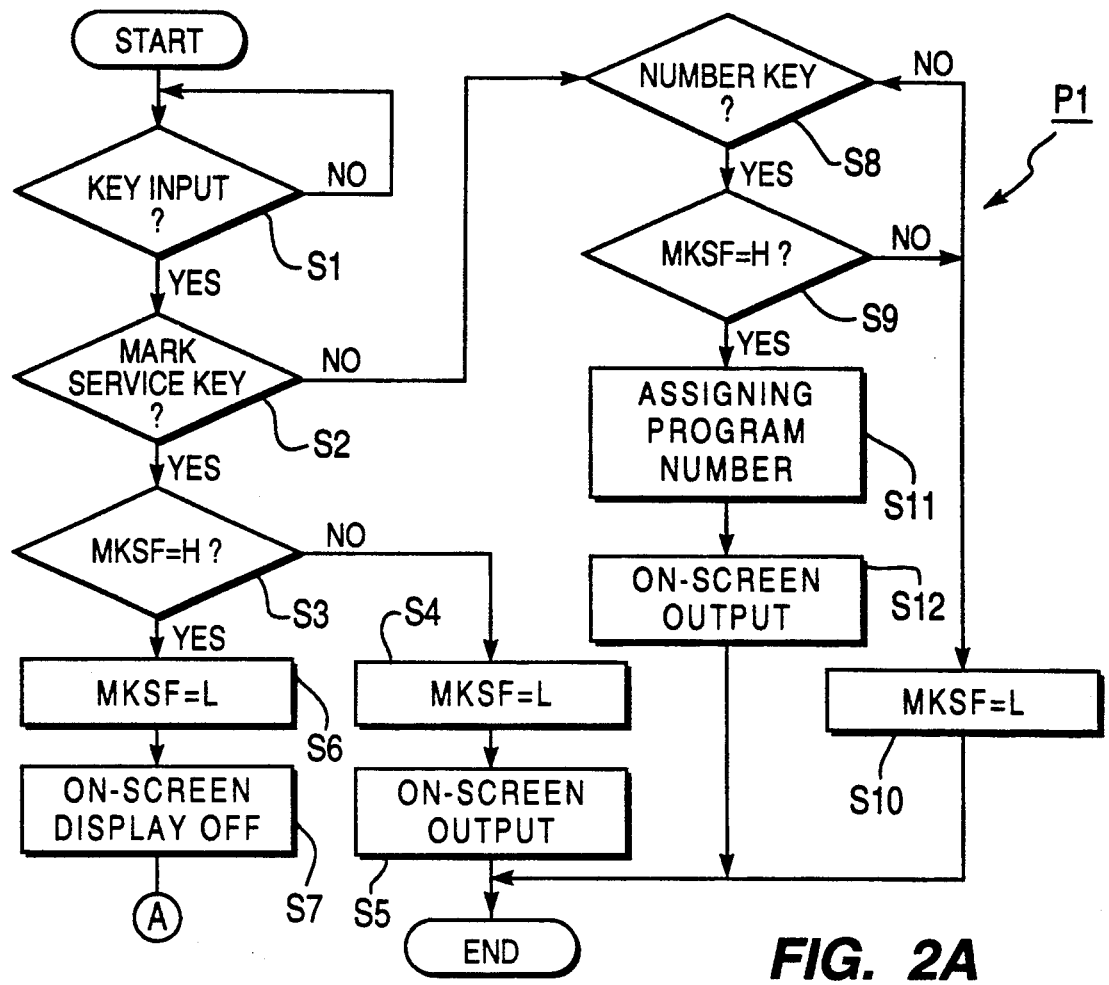
FIGS. 2A, 2B and 2C are flowcharts representing a control method of the automatic copy apparatus of a double-deck VCR according to the present invention.
Figure 2C:
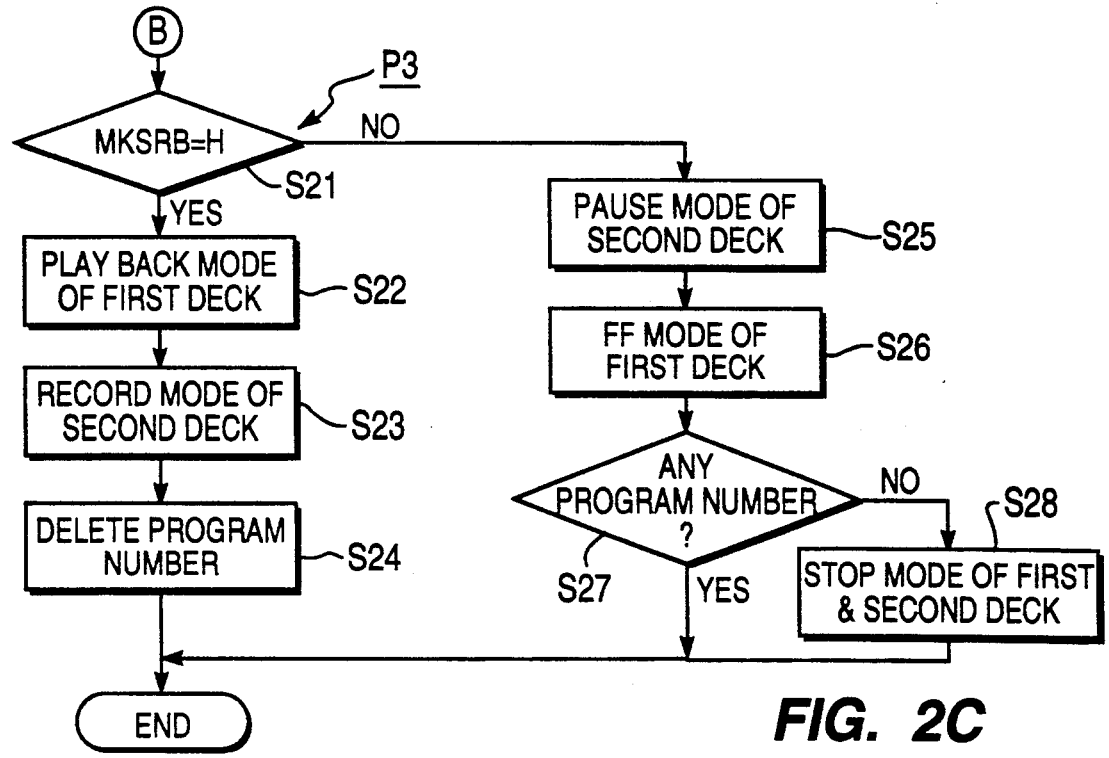
Figure 2B:
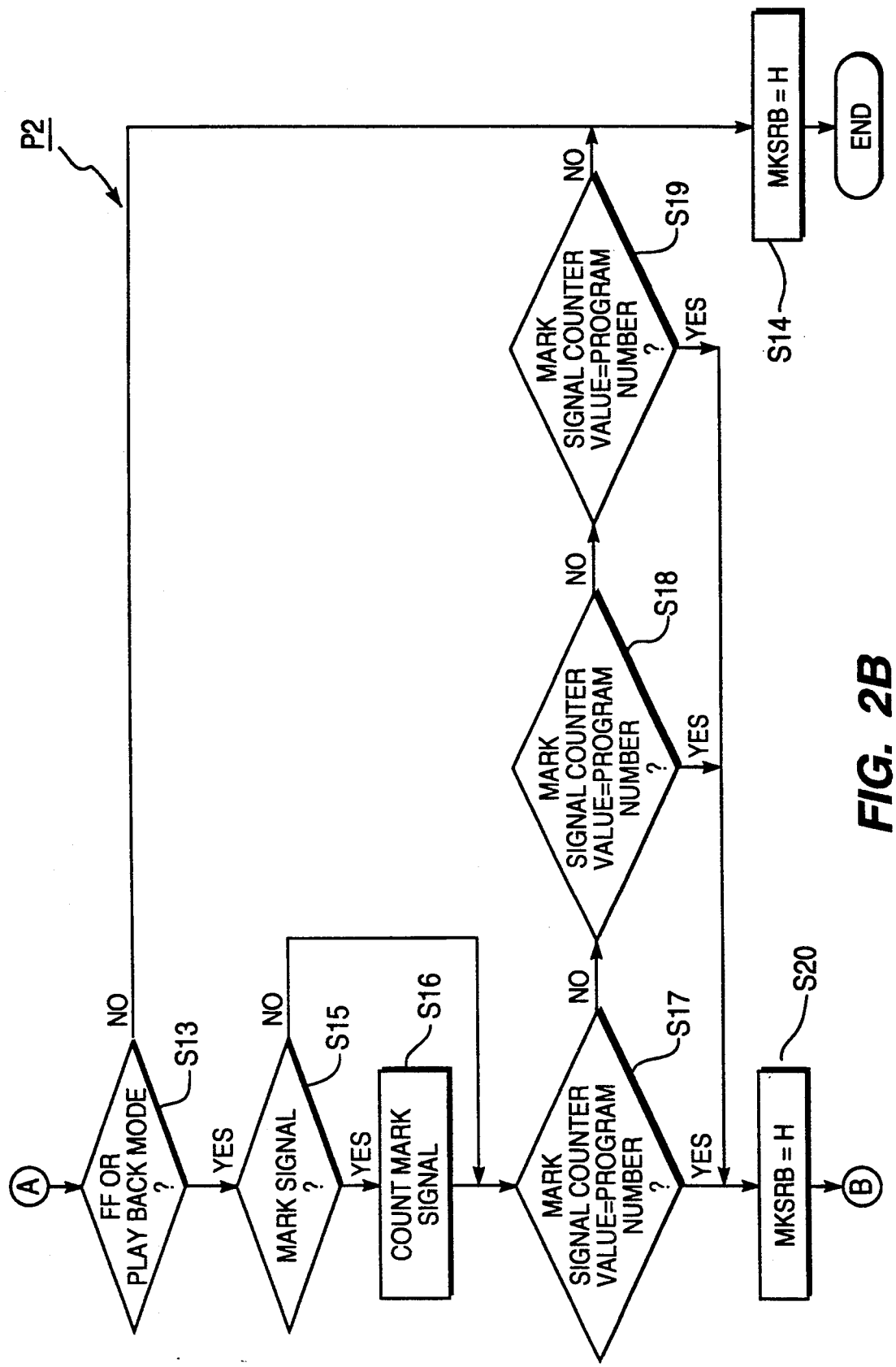

FIGS. 2A, 2B and 2C show flowcharts for explaining the method of controlling the automatic copy apparatus of a double-deck VCR according to the present invention.

In a process P1 in FIG. 2A, is a message instructing an user to select a desired program is displayed on the screen of a character generator 20 and an input program number of the desired program is assigned by the user using number keys of the keyboard 5. The programs in the tape are numbered and one of the numbers is selected if desired.

P2 in FIG. 2B represents a second process where the tape of the first deck 30 is fast searched to detect mark signals located at the start of each recorded program and count the detected mark signals to decide whether the counted mark signal is equal to the input program number.

Also, P3 in FIG. 2C represents a third process where the first deck 30 performs a playback mode and the second deck 35 performs a copy mode if the counted mark signal is equal to the input program number.

If the counted mark signal is not equal to the input program number, the first deck 30 performs a fast forward mode and the second deck 35 performs a pause mode.

Figure 3A:
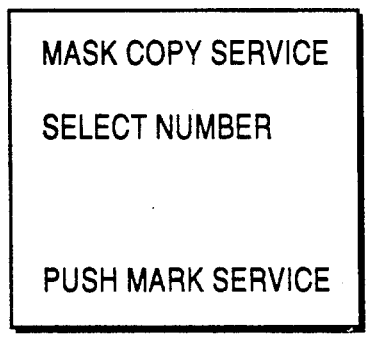
FIGS. 3A and 3B are on-screen displays for explaining the operation of the automatic copy apparatus of a double-deck VCR according to the present invention.
Figure 3B:
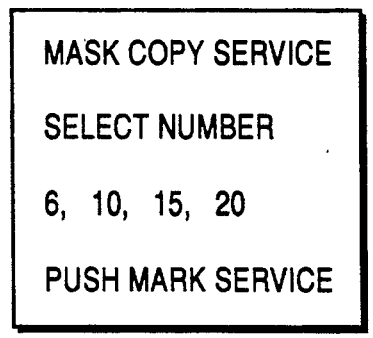

FIGS. 3A and 3B are diagram representing the displayed message which is generated by the character generator.

In a present invention described above, if the mark service key signal initiated from the keyboard 5 or the remote controller 10 is applied to the microprocessor 15, the microprocessor 15 controls the display 25 to display the selected automatic copy function by way of the character generator 20.

Subsequently, if an input from the number key in the keyboard 5 or the remote controller 10 is applied to the microprocessor 15, the microprocessor 15 controls the first deck 30 and the second deck 35 so that the program which has a mark signal corresponding to the input number key is copied. That is, the program in the tape of the first deck 30 is copied to that of the second deck 35 by the control of the microprocessor 15.

Now, the operation of the present invention will be described in more detail with reference to FIGS. 2A, 2B and 2C.

In process P1, the existence of an input from a key of keyboard 5 is checked in step S1 and the input key is distinguished to be either the mark service key or not in a step S2.

If the input key is the mark service key, it is checked whether mark service key flag (hereinafter, referred to "MKSF") has been set to high or not in step S3. If the MKSF has not been set high when a first mark service key is inputted, the MKSF is set high in step S4. Then, the message shown in FIG. 3A is displayed on the display by the character generator 20 in step S5.

Also, if the mark service key signal is applied and the MKSF has been set high when a mark service key is inputted a second time, the MKSF is set low in step S6 and the display is turned off in step S7. On the other hand, if the input key is not the mark service key step S8 determines whether the input key is a number key.

If the MKSF is not set high in a step S9, the MKSF is set low in step S10. But, if the number key was applied and the MKSF was high, data corresponding to the input key signal is stored assigned a program number in step S11 and the message as shown in FIG. 3B is displayed on the display in step S12.

FIG. 3B shows the numbers 6, 10, 15, and 20 applied by the number keys after the mark service key is applied.

In order to select only desired programs among many programs in the tape of the first deck 30 and then to copy them to the tape of the second deck 35, the display as shown in FIG. 3A is displayed by user selection of the mark service key and the program numbers shown in FIG. 3B are assigned by the user selecting the number keys. After completing the selection of the desired programs by the first process P1, a playback mode is performed by the second process P2.

In the process P2, step S13 determines whether the first deck 30 is in the fast search or playback mode. If the first deck 30 is not in the fast search or playback mode, a mark signal record flag, "MKSRB" in which mark signals from the tape of the first deck 30 are recorded, is set low in step S14.

If the first deck 30 is in the fast forward or playback mode in step S13, the existence of mark signals from the tape of the first deck 30 is determined in step S15. If a mark signal is detected in step S15, the mark signal is counted in step S16. That is, the mark signal is counted by adding one to a mark signal counter value during the fast forward mode or the playback mode of the first deck 30.

Also, steps S17~S19 check if the mark signal counter value of the mark signals in step S16 equals the program number in step S11. If the mark signal counter value does not agree with the program number, step S17 is repeated in steps S18 and S19, but if the mark signal counter value agrees with the program number, the MKSRB is set high in step S20.

Finally, in the third process P3, step S21 determines if MKSRB has been set high so that the first deck 30 is operated in the playback mode if the MKSRB is high in step S22 and the second deck 35 is operated in the record mode in step S23 to copy the program in the tape of the first deck 30 when the mark signal counter value is equal to the program number of a program in the tape of second deck 35.

After performing the steps S22 and S23, a stored program number in step S11 of the first process P1 is deleted in step S24. If MKSRB is low in step 21, the second deck 35 is set to the pause mode in step S25 and the first deck 30 is set to the fast forward mode in step S26.

Step 27 determines if any stored program number still remains. If there is no remaining program number, the first deck 30 and the second deck 35 are stopped in step 28.

As mentioned above, the present invention can select and copy only the desired programs out of many programs by operating the first deck in the playback mode and the second deck in the record mode when the desired programs are assigned by the program numbers and the mark signal counter value is equal to a program number. Therefore, copying a single program is simplified.

What is claimed is:

1. An automatic copy apparatus for a double-deck video cassette recorder for playing back video information on a first tape, said video information being indicative of programs, each program including a respective mark signal, recorded on said first tape, and recording, on a second tape, selected video information played back from said first tape, said selected video information being a desired program to be copied, the apparatus comprising:

a first deck for playing back said video information from said first tape and a second deck for copying selected video information onto said second tape;
 a keyboard having a mark service key, and a plurality of number keys;
 a microprocessor providing control signals for the apparatus, said microprocessor generating a first control signal in response to a first input signal, said first input signal being indicative of activation of said mark service key, and for generating a second control signal in response to a second input signal, said second input signal being indicative of activation of at least one of said plurality of number keys;

a character generator for generating a first message in response to said first control signal and a second message in response to said second control signal;

display means for displaying the first or second message generated by said character generator, wherein said first message prompts a user to select a desired program to be copied and said second message displays a number selected by said user by activation of at least one of said number keys, said displayed number corresponding to said desired program; and circuit controller means for driving circuits to control said first and second decks in response to further control signals generated by said microprocessor.

2. A method of controlling an automatic copy apparatus of a double-deck VCR, the method comprising the steps of:

displaying a message on a screen of a character generator instructing a user to select a number corresponding to a program recorded on a first tape on a first deck when a mark service key signal is entered by the user activating a mark service key on a keypad;

storing said number selected, said program to be played back from the first tape and recorded on a second tape on a second deck by the user using number keys on the keypad;

detecting a corresponding mark signal at a starting position of each program recorded on said first tape during one of fast forwarding and playing of the first tape;

counting each detected mark signal and determining whether a mark signal count value equals the stored number; and automatically operating said first deck in a play back mode for playing the first tape in said first deck and operating said second deck in a recording mode for recording on the second tape in the second deck the program played by said first deck when the mark signal count value equals the stored number.

3. An automatic copy apparatus, comprising:

a first deck for recording and reproducing information on a first tape and a second deck for recording and reproducing information on a second tape;

controller means for generating control signals for controlling said apparatus;

a keyboard comprising a mark service key for inputting a mark service key signal to said controller means, and a plurality of number keys for allowing the user to select a program to be copied, said controller means providing a message for instructing a user to select at least one program of a plurality of programs recorded on the first tape, wherein said controller means generates said control signals in response to said mark service key signal and in response to activation of said number keys;

character generator means for receiving said message and for generating characters to be displayed;

means for displaying the characters generated by said character generator, thereby displaying said message; and means for driving circuits to control said first and second decks in dependence upon said control signals.

4. A method of controlling an automatic copy apparatus of a double-deck tape recorder, comprising the steps of:

displaying a message, instructing a user to select a number corresponding to one of a plurality of programs recorded on a first tape of a first deck, on a screen of a display, said message being generated by a character generator in response to a mark service key signal generated as a result of said user activating a mark service key on a keypad;

storing said number of the program selected by said user activating number keys on the keypad;

detecting and counting mark signals recorded on said first tape, each mark signal corresponding to a respective one of said plurality of recorded programs, and generating a mark signal count value as a result of said detecting and counting step;

determining when said mark signal count value is equal to the stored number; and when the mark signal count value equals the stored number, playing the program of the first tape corresponding to said selected number and copying the program being played on a second tape in a second deck.

5. An apparatus for controlling automatic copying in a multi-deck tape recorder, comprising:

a first tape in a first deck, said first tape comprising a first number of prerecorded programs wherein each program includes at least one mark signal, said at least one mark signal being indicative of the beginning of a respective one of said programs;

a second tape in a second deck;

means for inputting a mark service signal and for inputting a number for selecting at least one of said programs to be copied onto said second tape;

means for storing said number;

means for controlling said first deck to fast forward said first tape and for controlling said second deck to pause said second tape in response to said number being stored by said storing means;

means for detecting said mark signals;

means for generating a count signal by counting each said detected mark signal during said fast forwarding of said first tape; and comparing means for comparing said count signal to said stored number;

said means for controlling said first deck controls said first deck to operate in a playback mode to play back the program corresponding to said selected number from the first tape in the first deck while said means for controlling said second deck simultaneously controls said second deck to operate in a recording mode to copy the program being played back by said first deck onto the second tape in the second deck when said comparing means determines said count signal is equal to said stored number.

6. The apparatus of claim 1, wherein said further control signals generated by said microprocessor comprise:

a third control signal for causing said first deck to operate in a fast forward mode;

a fourth control signal for causing said second deck to operate in a pause mode when said first deck is operated in said fast forward mode;

a fifth control signal for causing said first deck to operate in a playback mode; and a sixth control signal for causing said second deck to operate in a copy mode when said first deck is in said playback mode.

7. The apparatus of claim 6, wherein said microprocessor:
stores said number selected by said user and generates said third and fourth control signal;
counts each said mark signal when said first deck is in said fast forward mode and generates a count signal;
compares said count signal to said stored number; and
generates said fifth and sixth control signals when said count signal is equal to said stored number.

8. A dual deck tape recorder comprising:
a mark copy service key situated on a keypad of a key board or remote controller;
a plurality of number keys situated on said keypad;
processing means for receiving a first input signal generated in response to activation of said mark copy service key, and a second input signal indicative of activation of at least one of said plurality of number keys;
character generation means for generating a first plurality characters corresponding to a first message output from said processing means in response to said first input signal and for generating a second plurality of characters corresponding to a second message output from said processing means in response to activation of said at least one number key;
display means displaying said first plurality of characters to prompt a user to activate desired ones of said number keys and for displaying said second plurality of characters to inform the user as to which ones of said number keys was activated;
said processing means storing a first value corresponding to the activated number keys;
a first deck for receiving a first tape, wherein said first tape has recorded thereon a plurality of programs and a plurality of mark signals, each mark signal corresponding to and located at the start of each program;
said processing means controlling said first deck to fast forward said first tape, generating a count value by counting each mark signal detected on said tape and controlling said first deck to operate in a playback mode when said count value is equal to said stored first value; and
a second deck for receiving a second tape;
said processing means controlling said second deck to operate in a recording mode to record, on said second tape, a program played back during the playback mode of the first deck.

9. The dual deck tape recorder as claimed in claim 8, wherein said dual deck tape recorder is a dual deck video tape recorder and said programs are video programs.

10. A method for recording, on a second tape, a selected program played back from a first tape in a dual deck recorder having a key board and a microprocessor, said method comprising:
checking for an input signal from said key board;
determining whether said input signal is indicative of activation of a mark service key on said key board;
determining whether a mark service flag in said microprocessor is high when said input signal is determined to be indicative of activation of said mark service key;
setting said mark service flag to low if said mark service flag is high when said input signal is determined to be indicative of activation of said mark service key;
controlling a display to be off in response to said step of setting said mark service flag to low;
setting said mark service flag to high if said mark service flag is not high when said input signal is determined to be indicative of activation of said mark service key;
controlling said display to be on and displaying a first message in response to said step of setting said mark service flag to high;
displaying a number corresponding to activation of ones of a plurality of number keys on said key board and storing a first value corresponding to said number;
fast forwarding said first tape, counting mark signals detected on said first tape, said mark signals corresponding to and indicative of respective recorded programs, and generating a count value for each counted mark signal;
playing back at least one of said recorded programs on said first tape when said count value is equal to said first value; and
simultaneously recording said at least one of said recorded programs on said second tape during said playing back step.

11. The method as claimed in claim 10, further comprising the steps of:
determining whether said input signal from said key board is indicative of activation of ones of said number keys when said input signal is determined not to be indicative of activation of a mark service key;
determining whether said mark service flag in said microprocessor is high when said input signal is determined to be indicative of activation of ones of said number keys;
storing, as said first value, a value corresponding to said activated ones of said number keys if said mark service flag is not high when said input signal is determined to be indicative of activation of ones of said number keys;
displaying a message indicating which ones of said number keys were activated;
setting said mark service flag to low when said input signal has been determined not to be indicative of said mark service key nor said number keys being activated; and
setting said mark service flag to low when said mark service flag in said microprocessor is not high when said input signal is determined to be indicative of activation of ones of said number keys.

* * * * *

UNITED STATES PATENT AND TRADEMARK OFFICE
CERTIFICATE OF CORRECTION

PATENT NO. : 5,280,392
DATED : January 18, 1994
INVENTOR(S) : Min-Hoe Koo

It is certified that error appears in the above-indentified patent and that said Letters Patent is hereby corrected as shown below:

On the title page, item [75] Inventor: change "Min H. Koo" to --Min-Hoe Koo--.

Column 3, line 1, delete "Also,";

line 12, preceding "mark", change "the" to --a--;

line 18, preceding "number", change "the" to --a--;

line 32, preceding "step", delete "a"; and line 50, after "stored", insert --and--.

Signed and Sealed this

Eleventh Day of October, 1994

Attest:

BRUCE LEHMAN

*Attesting Officer*     *Commissioner of Patents and Trademarks*